United States Patent [19]

Gibler et al.

[11] Patent Number: 5,283,852
[45] Date of Patent: Feb. 1, 1994

[54] APPARATUS AND METHOD FOR EMBEDDING OPTICAL FIBERS IN METAL

[75] Inventors: William N. Gibler, Bryan; Robert A. Atkins, College Station; CHung-Eun Lee, College Station; Henry F. Taylor, College Station, all of Tex.

[73] Assignee: The Texas A & M University System, College Station, Tex.

[21] Appl. No.: 926,756

[22] Filed: Aug. 7, 1992

[51] Int. Cl.⁵ ............................................. G02B 6/44
[52] U.S. Cl. .................................... 385/136; 385/102; 385/137; 65/3.3
[58] Field of Search ................. 385/136, 12, 127, 128, 385/139, 102; 65/3.3

[56] References Cited

U.S. PATENT DOCUMENTS

| | | | |
|---|---|---|---|
| 4,119,363 | 10/1978 | Camlibel et al. | 350/96.20 |
| 4,345,816 | 8/1982 | Nakai et al. | 350/96.20 |
| 4,390,589 | 6/1983 | Geyling et al. | 385/128 X |
| 4,653,846 | 3/1987 | Yamazaki et al. | 350/96.20 |
| 4,657,346 | 4/1987 | Berry et al. | 350/320 |
| 4,891,640 | 1/1990 | Ip | 340/853 |
| 4,904,046 | 2/1990 | Paschke et al. | 350/96.20 |
| 4,948,406 | 8/1990 | Kornmann | 65/3.3 |
| 5,091,987 | 2/1992 | McCulloch et al. | 385/66 |
| 5,127,083 | 6/1992 | Ikeda et al. | 385/138 |
| 5,152,817 | 10/1992 | Bennett et al. | 385/128 |

*Primary Examiner*—John D. Lee
*Assistant Examiner*—Phan Thi Heartney
*Attorney, Agent, or Firm*—Baker & Botts

[57] ABSTRACT

Optical fibers are embedded in metal structures and components by using a pair of stress-relieving tubes at the air-metal interface of the optical fiber.

21 Claims, 2 Drawing Sheets

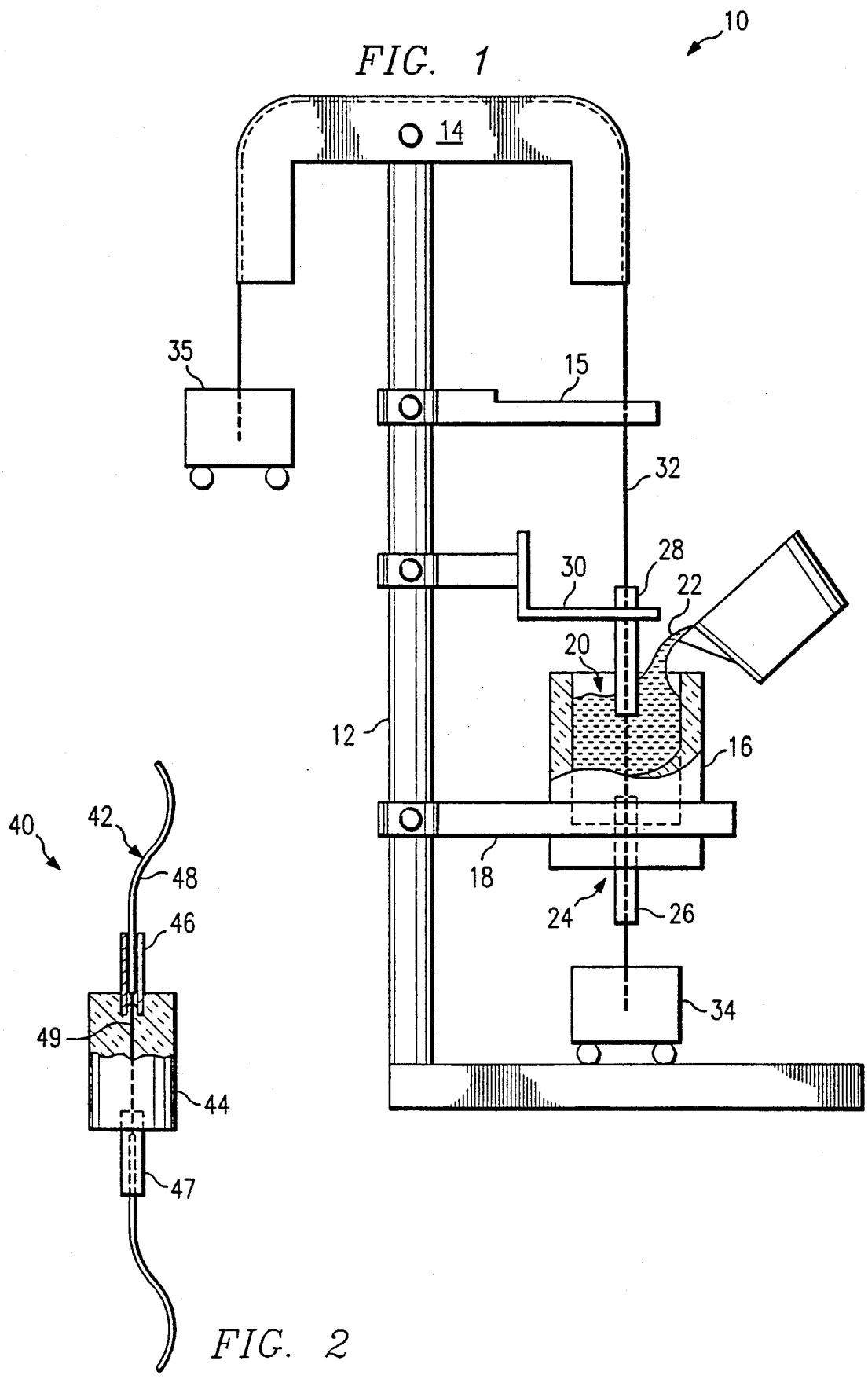

APPARATUS AND METHOD FOR EMBEDDING OPTICAL FIBERS IN METAL

TECHNICAL FIELD OF THE INVENTION

This invention relates in general to the field of fiber optics. More particularly, the present invention relates to apparatus and method for embedding optical fibers and optical fiber sensors in metal.

BACKGROUND OF THE INVENTION

Ever since the introduction of the fiber optics technology, the optical fiber has proven to be a most versatile and promising means of transmitting data and information. Recent advanced developments in fiber optics sensor technology have spurred considerable research on embedding optical fibers and optical fiber sensors in various materials and structures. Studies have been conducted on embedding optical fibers in graphite-epoxy composites, plastics, concrete, and solder metals with relatively low melting temperature of 190° C.

Optical fibers and sensors embedded in metals with much higher melting temperatures and strengths are desirable in numerous applications. For example, if metal-embedding were possible, an optical fiber sensor can then be cast into the cylinder head of an internal combustion engine to monitor its performance. In addition, metal-embedded fibers are applicable to connectors and feedthroughs in, for example, vacuum systems, undersea vehicles, undersea repeaters, chemical processing plants, and steam power plants. Metal-embedded fiber sensors may also find application in smart structures, such as aircraft wings and fuselages, ships, spacecraft, bridges, and buildings.

Previous attempts to embed optical fibers in metals with high melting temperatures have all resulted in failure. The fragile fibers invariably break either at or near the air-metal interface. The fiber breakage has been attributed to the stress inflicted on the fiber by the contraction of the surrounding metal as it cools from its melting temperature to room temperature. Therefore, it is obvious that resolution of the fiber breakage problem in embedding optical fibers in metals has broad implications. The present invention is a novel and unique solution to this problem.

SUMMARY OF THE INVENTION

In accordance with the present invention, apparatus and method for embedding optical fibers in metal are provided which substantially eliminate or reduce disadvantages and problems associated with prior apparatus and methods.

In one aspect of the present invention, a method for embedding optical fibers in metals uses stress-relieving tubes at the air-metal interfaces. The optical fiber is inserted through the tubes, which are positioned partially extending into the mold. The ends of the fiber extend beyond the tubes. Molten metal is then introduced into the mold, embedding the optical fiber and the stress-relieving tubes.

In another aspect of the present invention, one or more optical fibers are embedded in a metal component or structure by using stress-relieving tubes at the air-metal interface of the fibers. The stress-relieving tubes extend at least partially into the metal component.

BRIEF DESCRIPTION OF THE DRAWINGS

For a better understanding of the present invention, reference may be made to the accompanying drawings, in which:

FIG. 1 is a simplified diagram illustrating a preferred method for embedding optical fibers in a metal structure;

FIGS. 2 and 3 are elevational views of metal-embedded embedded optical fibers in several arrangements;

DETAILED DESCRIPTION OF THE INVENTION

Figure 3:
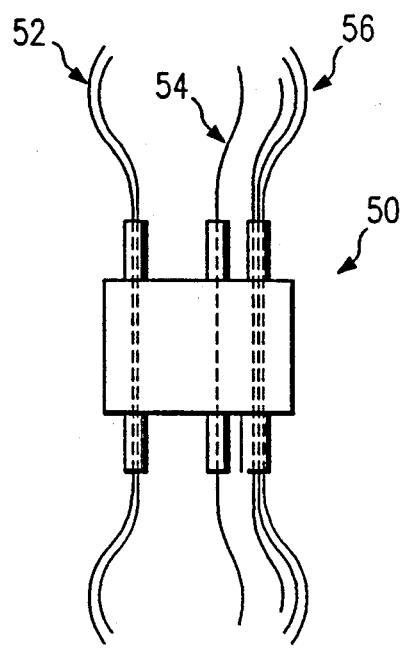

With reference to the drawings, FIG. 1 illustrates a setup 10 for embedding optical fibers in metal in accordance with the teachings of the present invention. Setup 10 includes a stand 12 with fiber guides 14 and 15. A mold 16 constructed of investment, sand, graphite, or other materials known in the foundry art is held by a holder 18 attached to stand 12. The shape and dimension of the mold cavity generally determine the outer shape and dimension of the resulting metal component.

Mold 18 has an opening 20 for receiving a molten metal 22, and a small opening 24 at the bottom. The size of opening 24 is such that it permits a stress-relieving tube 26 to be inserted therethrough, but to leave minimal gap between opening 24 and the outer surface of tube 26 so that molten metal in the mold cavity cannot escape through it. In addition, the inside diameter of tube 26 is such that it accommodates one or more optical fibers or sensors and yet minimizes the entry of molten metal. For example, tubes having an outside diameter of 1.6 millimeters and an inside diameter of 0.5 millimeters have been shown to properly serve this purpose. Another tube 28 of similar construction and size is similarly positioned at the top opening 20 of mold 16, shown held in place by a holder 30. Tubes 26 and 28 may be constructed of metals, such as stainless steel, or ceramic and other suitable materials. Tubes 26 and 28 may, as an example, extend approximately one centimeter into the mold cavity. The length of each tube 26 and 28 is arbitrary but could, for example, be approximately two inches, and the tube lengths need not be the same. The length of tubes 26 and 28 preferably depends on the nature of the resultant metal part or structure. It is also contemplated that the portions of tubes 26 and 28 that extend beyond the metal part or structure may be removed after molten metal 22 has cooled.

An optical fiber or a fiber containing an internal sensor 32 is then inserted through tubes 26 and 28, and therefore the mold cavity. If fiber 32 is wrapped within a protective shield or buffer (not shown), it is removed from the portion of fiber 32 to be embedded in metal. In setup 10, weights 34 and 35 are attached to the respective ends of optical fiber 32 to effect a tensile load thereon. The magnitude of this load is a matter of engineering design, but could be approximately 20g, for example. Proper alignment of fiber 32 and tubes 26 and 28 are held and maintained by fiber guides 14 and 15 on stand 12. The tensile force ensures that the portion of fiber 32 within the metal part is straight. Those fibers having internal sensory structures such as the fiber Fabry-Perot interferometer (not shown) should be positioned so that the portion of the fiber containing the sensory structure is situated within the mold cavity.

After stress-relieving tubes 26 and 28 and optical fiber 32 have been positioned properly, molten metal 22 may be poured into the mold cavity. Molten metal 22 may be aluminum, aluminum alloys or other suitable metals or metal alloys. The only constraint for the purpose of embedding optical fibers is the melting temperature of the metal used. The melting point of molten metal 22 should be less than that of fiber 32, which is approximately 1600° C. for glass fibers and over 2000° C. for sapphire fibers.

Molten metal 22 is allowed to cool to or near room temperature before removing the resultant embedded optical fiber metal component from mold 16. It is important to note that setup 10 as shown in FIG. 1 is merely illustrative to point to the necessary steps for embedding optical fibers in metal and the present invention is not necessarily so limited.

Referring to FIG. 2, a more detailed elevational view of a resultant embedded optical fiber metal component 40 is shown. An optical fiber 42 is embedded in a metal part 44 threaded through partially-embedded stress-relieving tubes 46 and 47. Optical fiber 42 may be wrapped within a protective shield or buffer 48, but shield 48 is removed from the portion of fiber 42 buried in metal part 44. FIG. 3 serves to illustrate the unrestricted application of the instant invention. A metal component or structure 50 may have more than one embedded fiber in a number of possible arrangements 52-56. Arrangements 52 and 56 each have multiple optical fibers inserted through a pair of stress-relieving tubes. Arrangement 54 has one fiber embedded through one pair of stress-relieving tubes.

Figure 4:
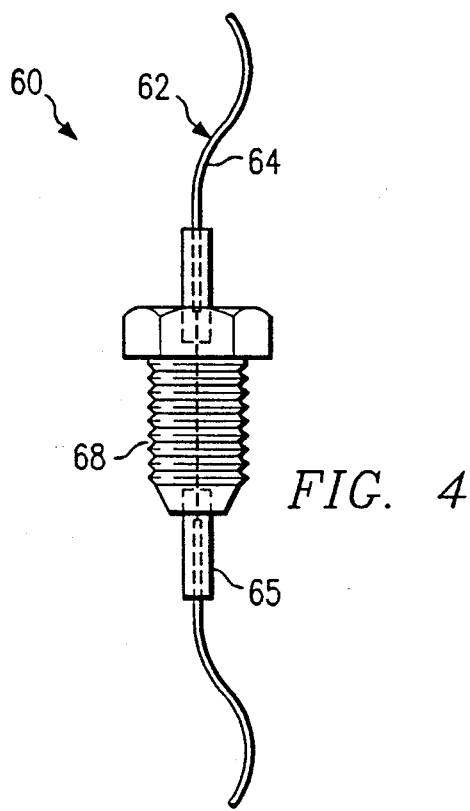
FIG. 4 is an elevational view of an embedded fiber bolt assembly.
Figure 5:
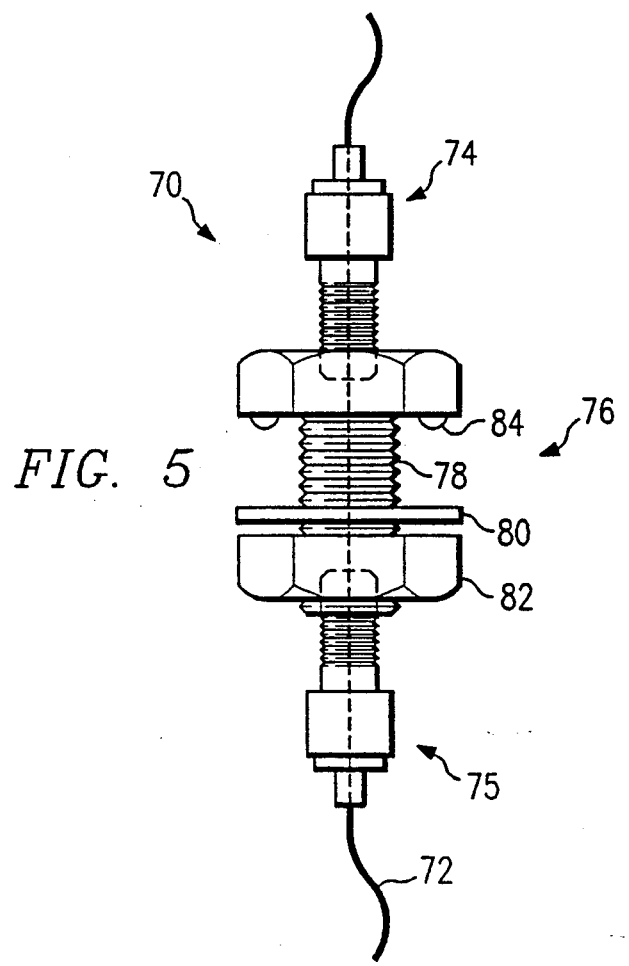
FIG. 5 is an elevational view of an embedded fiber feedthrough component.

Referring to FIG. 4, a possible implementation of an optical fiber feedthrough 60 in accordance with the present invention is shown. Optical fiber 62 is embedded, along with partially embedded stress-relieving tubes 64 and 65, in a metal part that has been machined into a bolt assembly 68. Bolt assembly 68 has been threaded so that it can be screwed or fastened into a larger structure. Another implementation of an optical feedthrough 70 is shown in FIG. 5. An optical fiber 72 is fed through connectors 74 and 75 also partially embedded in metal part 78. Connectors 74 and 75 may be prefabricated prior to the fiber embedding process, or can be fashioned after the process. As shown, connectors 74 and 75 are of the decouplable type. Metal part 78 has been machined and threaded. A washer or spacer 80 and a nut 82 are also provided for attachment to part 78. Metal part 78 is further constructed for accommodating a vacuum seal or O-ring 84 to effect a hermetic seal. It can be seen that by using the teachings of the instant invention, optical fibers can be embedded into metals that are commonly used in structural constructions, and therefore the optical fibers can be cast directly into an existing component of a structure or system, such as an engine cylinder head.

Figure 6:
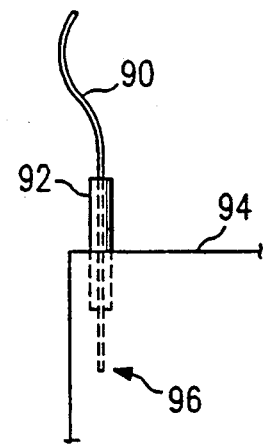
FIG. 6 is an elevational view of an alternate embodiment of the present invention.

FIG. 6 illustrates an alternate embodiment of an embedded optical fiber or sensor 90. Fiber or sensor 90 is inserted through a stress-relieving tube 92 partially embedded in a metal component or structure 94. Rather than positioning the fiber or sensor 90 so that both of its ends extend beyond the mold for constructing metal component 94, fiber or sensor 90 terminates in an embedded end 96. Constructed in this manner, optical signals may be delivered in fiber or sensor 90 and signals reflected by end 96 may be received and analyzed.

From the foregoing, the metal-embedded fiber and fiber feedthroughs can be made much smaller, cheaper and more effective in eliminating leakage than conventional O-ring feedthroughs. The embedded fiber sensors, such as the fiber Fabry-Perot interferometer, find wide application in monitoring a myriad structures and systems.

Although the present invention has been described in detail, it should be understood that various changes, substitutions and alterations can be made thereto without departing from the spirit and scope of the present invention as defined by the appended claims.

What is claimed is:

1. A method for embedding optical fibers in metal, comprising the steps of:
   forming a mold defining a cavity, said mold having walls defining a first opening;
   inserting one end of a first tube through said first opening of said mold and extending into said mold cavity, another end thereof extending beyond said first opening;
   inserting said optical fiber through said first tube and one end thereof extending into said mold cavity;
   introducing a metal in a liquid state into said mold cavity and permitting said metal to solidify and embed said first tube and said optical fiber therein; and
   removing said solidified metal and embedded tube and optical fiber from said mold.

2. The method, as set forth in claim 1, further comprises the step of positioning a second tube at a second opening substantially opposing said first end, one end thereof extending into said mold cavity, another end extending beyond said second opening.

3. The method, as set forth in claim 2, further comprising the step of inserting at least one additional optical fiber through both said first and second tubes and said mold cavity.

4. The method, as set forth in claim 2, further comprising the steps of positioning at least one additional pair of first and second tubes at said first and second mold openings and inserting at least one optical fiber therethrough.

5. The method, as set forth in claim 2, wherein said step of positioning said second tube includes the step of substantially aligning said second tube with said first tube.

6. The method, as set forth in claim 2, further comprising the step of applying a predetermined tensile load to said optical fiber.

7. The method, as set forth in claim 1, wherein said optical fiber inserting step further comprises the step of inserting an optical fiber encompassing a sensor.

8. The method, as set forth in claim 1, further comprising the step of fashioning said solidified metal into a predetermined metal component.

9. The method, as set forth in claim 1, further comprising the step of fashioning said first and second tubes into predetermined components.

10. The method, as set forth in claim 1, wherein said first and second tube inserting and positioning steps use tubes constructed of stainless steel.

11. The method, as set forth in claim 1, wherein said metal introducing step introduces molten aluminum into said mold.

12. Apparatus having at least one embedded optical fiber, comprising:
- a metallic component;
- a first tube of a first predetermined diameter and having two ends, at least one of said ends being embedded in said metallic component;
- a second tube of a second predetermined diameter and having two ends, at least one of said ends being embedded in said metallic component; and
- an embedded portion of said optical fiber being embedded in said metallic component between said first and second tubes.

13. Apparatus having embedded optical fibers, comprising:
- a first tube through which at least one of said optical fiber passes; and
- a metallic component having a first end and embedding said first tube and said optical fiber, said first tube extending partially beyond said first end of said metallic component, and said optical fiber extending beyond said first end of said metallic component, said optical fiber comprising an optical sensor.

14. The apparatus, as set forth in claim 13, wherein said metallic component further comprises means for coupling to a larger structure.

15. The apparatus, as set forth in claim 14, wherein said coupling means comprises a threaded coupling.

16. The apparatus, as set forth in claim 13, wherein one end of said optical fiber terminates within said metallic component.

17. The apparatus, as set forth in claim 13, further comprising a second tube extending partially beyond a second end of said metallic component, said second tube in substantial alignment with said first tube, and said optical fiber extending beyond both said first and second tubes.

18. The apparatus, as set forth in claim 13, wherein said first tube is constructed of stainless steel.

19. The apparatus, as set forth in claim 13, wherein said metallic component in constructed of aluminum.

20. A method for embedding an optical fiber comprising the steps of:
- inserting said optical fiber through first and second stress-relieving tubes; and
- casting metal about said optical fiber and said stress-relieving tubes, said stress-relieving tubes being positioned at air-metal interfaces.

21. The method, as set forth in claim 20, further comprising the step of straightening said optical fiber during said casting step.

* * * * *